United States Patent [19]

Butzen

[11] Patent Number: 5,678,508
[45] Date of Patent: Oct. 21, 1997

[54] EASY CLEAN AND CHANGE LITTER BOX MACHINE

[76] Inventor: Thomas J. Butzen, 233 Warner Ct., Ballwin, Mo. 63021

[21] Appl. No.: 526,997

[22] Filed: Sep. 12, 1995

[51] Int. Cl.[6] ................................................ A01K 1/035
[52] U.S. Cl. .................................................... 119/166
[58] Field of Search ....................... 119/166; 209/235, 209/417, 418, 419, 420

[56] References Cited

U.S. PATENT DOCUMENTS

| 645,956 | 3/1900 | Hyrons | 209/418 |
|---|---|---|---|
| 732,504 | 6/1903 | Belknap | 209/419 |
| 944,501 | 12/1909 | Portnoy | 209/419 |
| 4,096,827 | 6/1978 | Cotter | 119/166 |
| 4,190,525 | 2/1980 | Menzel | 119/166 |
| 4,465,018 | 8/1984 | Mopper | 119/166 |
| 5,048,465 | 9/1991 | Carlisi | 119/166 |
| 5,402,751 | 4/1995 | De La Chevrotiere | 119/166 |
| 5,463,982 | 11/1995 | Murphy | 119/166 |

*Primary Examiner*—Robert P. Swiatek
*Assistant Examiner*—Elizabeth Shaw
*Attorney, Agent, or Firm*—Patent & Trademark Services, Inc.; Joseph H. McGlynn

[57] ABSTRACT

A pet litter box consisting of a box with a pair of hoppers. One of the hoppers is used to clean the litter box and has a mesh bottom for screening out solid waste from the litter. The other hopper is used for changing the litter and is the same as the cleaning hopper except it has a solid bottom.

6 Claims, 1 Drawing Sheet

EASY CLEAN AND CHANGE LITTER BOX MACHINE

BACKGROUND OF THE INVENTION

This invention relates in general to pet litter boxes and in particular to a litter box for pets that will be convenient and easy to use. Pets, especially cats, kept indoors are conventionally provided with a litter box in which the animal may relieve itself. These litter boxes are usually a container with a quantity of "litter" in the bottom composed of sand, absorbent particles, or shredded paper. Commercial "litter" is also available which is designed to clump when it absorbs urine. When a litter box is cleaned an amount of useful litter remains along with solid waste and clumped granular material. Therefore, it is desirable to separate the useful litter from the remaining materials in the litter box.

DESCRIPTION OF THE PRIOR ART

In the prior art various types of litter boxes have been suggested. For example, U.S. Pat. No. 4,096,827 discloses a self-cleaning cat waste disposal system with two compartments pivotally connected together, one of which has a screen for trapping litter. U.S. Pat. No. 4,465,018 discloses a compartment which has a platform with a movable plastic sheet. A motor moves the plastic sheet and waste is dumped into a container at one end of the compartment. U.S. Pat. No. 5,048,465 discloses a litter box with a removable pan. A motor and timing device are provided for periodically moving a rake through the kitty litter to push solid waste to one end of the pan. U.S. Pat. No. 5,402,751 discloses a litter box with a cover and a screen. The box is rotated and waste is trapped by the screen. All of the prior art devices suffer many disadvantages, the most glaring being a device which is complicated and, therefore, expensive and prone to breaking down.

SUMMARY OF THE INVENTION

The present invention is designed to provide a simple litter box with no moving parts that are complicated to assemble, expensive and prone to breakage. It consists of a box with a pair of hoppers. One of the hoppers is used to clean the litter box and has a mesh bottom for screening out solid waste from the litter. The other hopper is used for changing the litter and is the same as the cleaning hopper except it has a solid bottom.

It is an object of the present invention to provide a litter box for pets that is of simple and, therefore, easy to manufacture and inexpensive.

It is an object of the present invention to provide a litter box for pets that is simple and fast to operate.

It is an object of the present invention to provide a litter box for pets that is compact and adaptable to most locations in a home.

These and other objects and advantages of the present invention will be fully apparent from the following description, when taken in connection with the annexed drawings.

DESCRIPTION OF THE PREFERRED EMBODIMENT

Figure 1:
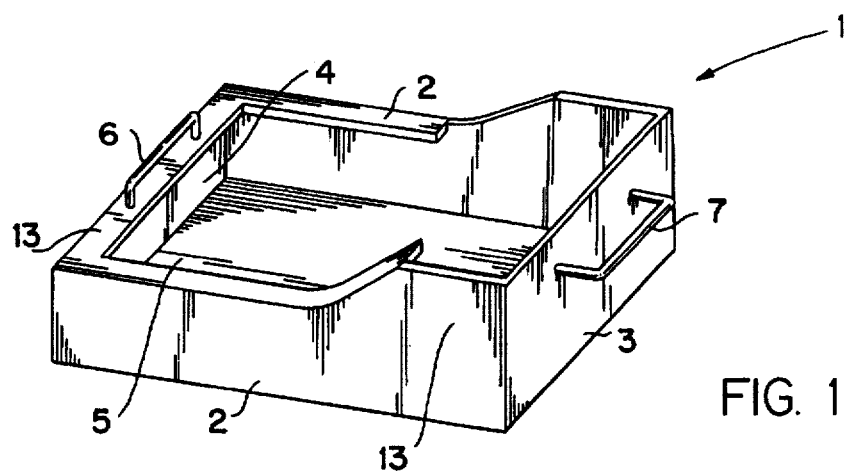
FIG. 1 is a perspective view of the litter box of the present invention.

Referring now to the drawings in greater detail, FIG. 1 shows the litter box I of the present invention. The box has sides 2, a front 3 with a handle 7 attached thereto, and a back 4 which also has a handle attached thereto, and a bottom 5. The sides 2 are higher 13 at the front of the box. The handles 6 and 7 will be used for moving the box and the handle 6 will be used during cleaning the box and changing the litter. At the back of the box 1 is a lip 13 which runs completely around the top of the box at the rear but does not extend all the way to the front of the box. This will allow the cleaning and/or changing hoppers 8, 8' to be inserted into the box 1.

Figure 2:
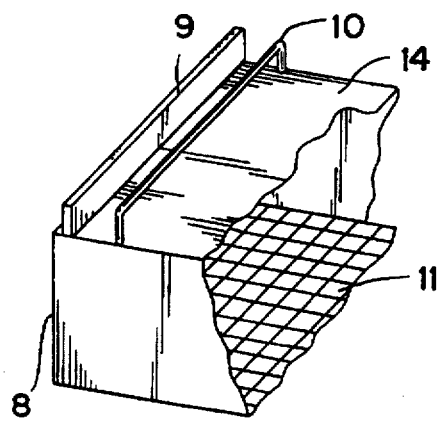
FIG. 2 is a perspective view of the cleaning hopper of the present invention.

In FIG. 2 the cleaning hopper 8 is shown with the front of the hopper cut away to clearly show the wire mesh screen floor 11. The cleaning hopper 8 has a handle 10 to aid in handling the hopper and a sliding gate 9, for a purpose to be explained later. The gate 9 is attached to the sides of the hopper 8 so it can be slid up and down, and it can be attached to the sides of the hopper in any manner to accomplish this function. For example grooves can be formed in the inside side walls of the sides of the hopper and the gate 9 can be placed in these grooves to slide up and down. Both the cleaning hopper 8 and the changing hopper 8' have solid tops 14 and 14'.

Figure 3:
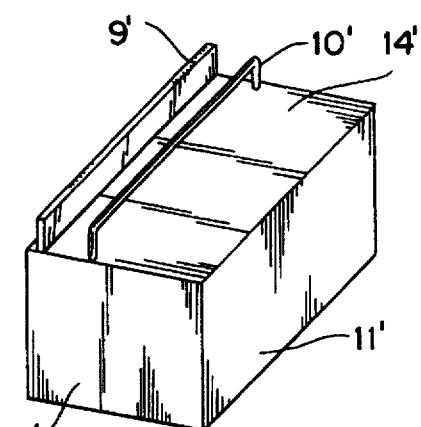
FIG. 3 is a perspective view of the changing hopper of the present invention.

FIG. 3 shows the changing hopper 8' of the present invention. Since it is similar to the cleaning hopper like numerals are used to identify similar parts with the addition of a "prime" attached to the numeral to differentiate between the two hoppers. The changing hopper 8' is identical to the cleaning hopper 8 and has a handle 10' to aid in handling the hopper 8' and a sliding gate 9' which can be attached similar to the gate 9. Unlike the cleaning hopper 8, the changing hopper 8' has a solid floor 11'.

Figure 4:
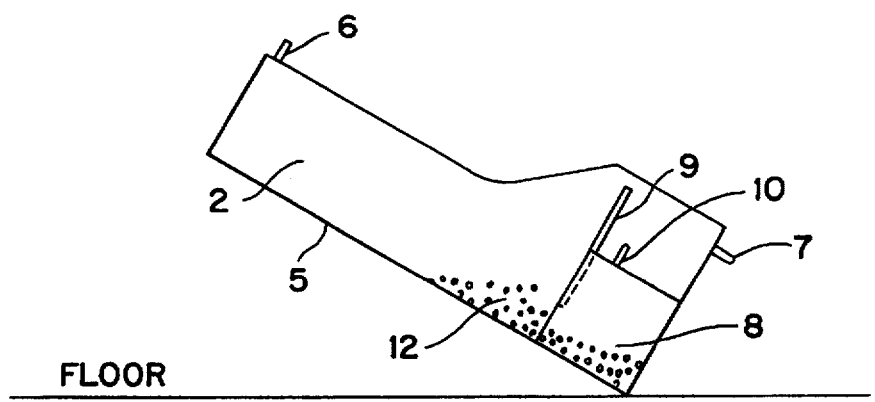
FIG. 4 is schematic view of the litter box being cleaned.

The method of using the litter box to clean and/or change the litter will now be described. In order to clean the litter 12 in the litter box 1, the user places the cleaning hopper 8 into the litter box and positions the hopper so it is against the front wall 3 of the litter box. The sliding gate 9 of the hopper will face away from the front wall 3 (as shown in FIG. 4). The gate 9 will then be slid into the up position and the user will grasp the handle 6 at the back of the litter box and the box will be tilted. This will cause the litter, the solid waste matter, and the "clumped" litter (the litter that has been wet by urine and which then forms into a "clump") to slide toward the front of the litter box 1 and into the opened hopper 8. When all the litter is in the hopper 8 the gate 9 will be closed and the hopper will be lifted straight up, using handle 10, and removed from the litter box 1. The cleaning hopper will then be held over the litter box and the contents sifted by shaking the hopper back and forth. The mesh floor 11 of the hopper will allow the unsoiled litter to sift back into the litter box 1 while the solid waste and "clumped" litter will remain in the hopper and then can be disposed of, or retained in the cleaning hopper until a final change of the litter is made.

In order to change the litter 12 in the litter box 1, the user places the cleaning hopper 8' into the litter box and positions the hopper so it is against the front wall 3 of the litter box. The sliding gate 9' of the hopper will face away from the front wall 3 in the same manner as the gate 9 of the cleaning hopper (as shown in FIG. 4). The gate 9'0 will then be slid into the up position and the user will grasp the handle 6 at the back of the litter box and the box will be tilted. This will cause the litter to slide toward the front of the litter box 1 and into the opened hopper 8'. When all the litter is in the hopper 8' the gate 9' will be closed and the hopper will be removed and the litter will be disposed of.

It should be noted that the hopper 8 can be stored in the litter box, or if more room for the pet is desired the hopper can be stored in another location until it is needed. Also, the litter box and hoppers can be made from various materials, however plastic is the preferred material.

Although the pet litter box and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A pet litter box which is adapted to contain litter material into which pet waste matter is deposited, said litter box comprising:

a bottom having a litter receiving area, front and rear walls and side walls, a collection means insertable into said litter box, said collection means extending approximately entirely from side wall to side wall of said litter box, said collection means having a bottom, side walls and a movable rear wall, whereby when it is desired to collect said litter material said collection means is inserted into one end of said litter box, and said movable rear wall may be moved into a position to allow said litter material to be moved into said collection means when said litter box is tilted.

2. The pet litter box as claimed in claim 1 wherein, said bottom of said collection means is made from a solid material.

3. The pet litter box as claimed in claim 1 wherein, said bottom of said collection means is made from a mesh material.

4. The pet litter box as claimed in claim 1 wherein, said litter box has a pair of handle means for moving said litter box.

5. A method of collecting soiled litter from a pet litter box, said litter box containing both soiled and unsoiled litter, said litter box comprising:

a bottom having a litter receiving area, front and rear walls and side walls, a collection means insertable into said litter box, said collection means having a mesh bottom, side walls and a movable rear wall, said method comprising:

inserting said collection means into one end of said litter box, moving said rear wall into a position to allow said soiled litter to be moved into said collection means, tilting said litter box so that said soiled and unsoiled litter will slide into said collection means, returning said rear wall to a position to close said collection means, removing said collection means from said litter box, shaking said collection means over said litter box until the unsoiled litter falls through said mesh bottom and into said litter box, and returning said collection means to said litter box to hold soiled litter until a next cleaning, or disposing of said soiled litter remaining in said collection means immediately.

6. A method of collecting litter from a pet litter box, said litter box containing both soiled and unsoiled litter, said litter box comprising:

a bottom having a litter receiving area, front and rear walls and side walls, a collection means insertable into said litter box, said collection means having a bottom, side walls and a movable rear wall, said method comprising:

inserting said collection means into one end of said litter box, moving said rear wall into a position to allow said soiled and unsoiled litter to be moved into said collection means, tilting said litter box so that said soiled and unsoiled litter will slide into said collection means, returning said rear wall to a position to close said collection means, removing said collection means from said litter box, and then disposing of said soiled and unsoiled litter remaining in said collection means.

* * * * *